US009389721B2

(12) United States Patent  
Lackey (10) Patent No.: US 9,389,721 B2  
(45) Date of Patent: Jul. 12, 2016

(54) SNAP DOMES AS SENSOR PROTECTION (75) Inventor: Mark Lackey, Raleigh, NC (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 13/369,808

(22) Filed: Feb. 9, 2012

(65) Prior Publication Data

US 2012/0200526 A1 Aug. 9, 2012

Related U.S. Application Data (60) Provisional application No. 61/441,002, filed on Feb. 9, 2011.

(51) Int. Cl.
*G06F 3/041* (2006.01)
*H01H 13/705* (2006.01)

(52) U.S. Cl.
CPC ........ *G06F 3/0414* (2013.01); *H01H 2215/006* (2013.01); *H01H 2215/036* (2013.01); *H01H 2221/03* (2013.01); *H01H 2221/064* (2013.01)

(58) Field of Classification Search
CPC ........... G06F 3/0414; H01H 2221/064; H01H 2215/006; H01H 2221/03; H01H 2215/036
USPC ............... 345/173, 174; 178/18.05–18.07; 361/679.01–815; 312/7.2; 200/513
See application file for complete search history.

(56) References Cited

U.S. PATENT DOCUMENTS

| 4,550,384 A | 10/1985 | Kimura |
| 5,541,372 A | 7/1996 | Baller |
| 6,040,846 A | 3/2000 | Stanton et al. |
| 6,492,979 B1 | 12/2002 | Kent et al. |
| 7,532,202 B2 | 5/2009 | Roberts |
| 8,026,906 B2 | 9/2011 | Molne et al. |
| 8,144,453 B2 | 3/2012 | Brown et al. |
| 8,269,731 B2 | 9/2012 | Molne |
| 8,270,148 B2 | 9/2012 | Griffith et al. |
| 8,421,483 B2 | 4/2013 | Klinghult et al. |
| 8,547,350 B2 | 10/2013 | Anglin et al. |
| 8,633,916 B2 | 1/2014 | Bernstein et al. |
| 8,738,104 B2 | 5/2014 | Yeates |
| 8,766,925 B2 | 7/2014 | Perlin et al. |
| 8,780,543 B2 | 7/2014 | Molne et al. |

(Continued)

FOREIGN PATENT DOCUMENTS

WO WO 2011/024461 3/2011

*Primary Examiner* — Lun-Yi Lao
*Assistant Examiner* — Ibrahim Khan
(74) *Attorney, Agent, or Firm* — Brownstein Hyatt Farber Schreck, LLP (57) ABSTRACT

A protection mechanism for force-based touch sensitive input panels or displays comprising a "snap dome", e.g., a semi-rigid pliable dome positioned over each sensor for increased overload protection. The snap dome is unidirectionally-resilient to a known point of collapse. It therefore imparts a pre-determined resistance to compression over a known range of travel along the z-axis, but is unyielding along the x- and y-axis. As the touch panel is depressed toward the standoff, the snap dome resists compression until it collapses, allowing the touch panel to encounter the standoff. The standoff then imparts dead-stop overload force protection to the sensors. This allows for the placement of mechanical stops (such as stop screws) with a less exacting tolerance. Moreover, the snap domes introduce no x- or y-axis force losses/increases, and do not cause tilting of the touch panel. The touch force remains perfectly perpendicular and accuracy is preserved.

20 Claims, 5 Drawing Sheets

(56) References Cited

U.S. PATENT DOCUMENTS

| | | | | |
|---|---|---|---|---|
| 2006/0119581 A1* | 6/2006 | Levy | ................... | G06F 3/0219 345/168 |
| 2006/0181517 A1 | 8/2006 | Zadesky et al. | | |
| 2006/0279548 A1 | 12/2006 | Geaghan | | |
| 2007/0119698 A1* | 5/2007 | Day | ................... | G06F 3/038 200/510 |
| 2009/0243817 A1* | 10/2009 | Son | ................... | G06F 3/0418 340/407.2 |
| 2010/0156814 A1 | 6/2010 | Weber et al. | | |
| 2010/0178957 A1* | 7/2010 | Chen | ................... | G06F 1/1626 455/565 |
| 2010/0245254 A1 | 9/2010 | Olien et al. | | |
| 2010/0300772 A1* | 12/2010 | Lee | ................... | G06F 3/03547 178/18.06 |
| 2011/0157087 A1 | 6/2011 | Kanehira et al. | | |
| 2011/0181402 A1* | 7/2011 | Goodrich | ................... | H01H 13/48 340/407.1 |
| 2011/0227872 A1 | 9/2011 | Huska et al. | | |
| 2011/0284348 A1* | 11/2011 | Nohechi | ................... | H01H 13/83 200/50.36 |
| 2012/0154315 A1 | 6/2012 | Aono | | |
| 2012/0327025 A1 | 12/2012 | Huska et al. | | |
| 2013/0342501 A1 | 12/2013 | Molne et al. | | |

* cited by examiner

SNAP DOMES AS SENSOR PROTECTION

CROSS-REFERENCE TO RELATED APPLICATION

The present application derives priority from U.S. provisional application No. 61/441,002 filed 9 Feb. 2011.

BACKGROUND OF THE INVENTION

1. Field of the Invention

The present invention relates generally to input devices for electronics and, more particularly, to a protection mechanism for force-based touch sensitive input panel or displays.

2. Description of the Background

Force-based touch screen systems (such as shown and described in U.S. Pat. No. 4,511,760 to Garwin et al. issued April 1985) are widely used in eBook readers, cellular phones and personal digital assistants (PDAs), PC Tablets, as well as laptops, PCs, office equipment, medical equipment, TVs Monitors, and other devices that use touch sensitive displays or panels.

In contrast to resistive, capacitive, infrared, Surface Acoustic Wave (SAW) or other more exotic touch screens, force-touch screen rely on pressure on or movement of a touch screen against underlying force sensors. They typically allow the touch surface to move a small distance in the z-plane (perpendicular to the touch surface) in order to ensure that the force is transferred completely without force additions, subtractions or delays to the underlying force sensors. There are commonly four force sensors placed in each corner of a rectangular touch panel. This direct transfer of touch force to the force sensors creates an inherent problem. Excessive force, or overload, can cause damage to the underlying sensors.

For example, in a typical application the HFD-500 Force Sensor From Hokuriku Electric Industry Co., Ltd., employs a small steel sphere ("ball") as its active mechanical surface, seated in a piezo resistive sensor. The purpose of this ball is to allow for a perfect and friction free transfer of the applied force into the piezo resistive sensor. The HFD-500 Force Sensor is capable of micro-force detection with high sensitivity within a range of from 0-0.5 kilograms. Typically, the HFD-500 Force Sensor will reach its maximum electronic capability at approximately 2.5 kilograms of load, and will reach its failure point at approximately 4.5 kilograms of load. It should be noted that these specifications are per individual sensor, and the total loading on the touch panel may be significantly higher depending on the number of sensors and sensor preload, if any. Of course, different force sensors can tolerate different levels of maximum force loading. Nevertheless, most all can be temporarily or permanently damaged if exposed to extreme forces, such as external abuse of a Kiosk touch screen as a result of vandalism or even during transportation.

To date, there have been very few efforts to protect the sensors from overload forces.

One potential solution implemented in the MyOrigo™ SmartPhone circa 2003 used a flexible material (plastic) to transfer to force from the touch panel to the sensors. During an overload force, the plastic bends and transfers the force to the sensor housing or other fixed mechanical stop. Unfortunately, the plastic material also tended to bend during normal operation resulting in some applied touch force being stored as energy in the plastic material. This reduced the accuracy of the touch screen system. In addition, this approach was only practical for smaller touch screen units (up to about 5 inches of touch screen diameter) where the touch screen and other components could likewise be plastic. Larger screens tend to use a mix of different materials rendering this approach impractical, and so this approach imposes size constraints.

Another approach is to use a stop screw. Stop screws are typically placed near the sensors and are adjusted in height during the manufacturing process. Given foreknowledge of the sensor travel (the z-axis range of the ball within sensor e.g., most force sensors, such as the HFD-500 Force Sensor From Hokuriku Electric Industry Co., Ltd., are compressed by around 0.05 mm or more), the stop screw is adjusted accordingly to stop further compression before an overload force is reached. Conversely, stop screws allow completely free touch panel movement without interference during normal operation. Unfortunately, the height of the stop screws need to be extremely precise, and the adjustment is a costly and time consuming process. A typical stop screw must be adjusted to take up sensor load within a travel band of approximately 0.05 millimeters (0.002"). Positioning of the traditional stop screw is critical to insure the screw is able to carry overload in all typical use and abuse scenarios. These limitations make for difficult and time consuming setting procedures and limit the layout of the sensor in relation to needed stop screw positioning.

Moreover, any small change to the mechanical structure through aging, bending, wear, etc., can render the stop screws useless or interfere with the accuracy of the touch screen under normal operational forces.

The mechanical design of a force based touch screen system must allow for a close-to-frictionless movement in the z-plane to ensure that the complete force (F) of the touch is directly transferred to the force sensors. Any unknown disturbing forces, such as friction or bending would have a negative impact on the system accuracy. Interfering forces can be allowed for, as long as they are known, repeatable and can be compensated for.

With the foregoing in mind compressible materials have been added between the touch panels and sensor, such as Poron™ microcellular polyurethane pads, or other material which can be compressed without permanent deformation. These resilient pads allow for a longer travel distance of the touch panel before sensor overload force is reached. The longer travel distance in turn allows for the placement of mechanical stops (such as stop screws) with a less exacting tolerance. To an extent the interfering forces of the damping pad(s) are known and can be compensated for. However, the pads inevitably introduce force losses (during compression) and force increases (during expansion) which have a negative impact on accuracy. Moreover, the pad's multi-directional deformation can cause tilting of the touch panel and introduce additional force reading errors if the touch force is no longer perfectly perpendicular.

And so despite conventional mechanical solutions for integration different types of force overload protection in force based touch screen systems, the foregoing and all other known solutions tend to compromise performance, accuracy, economy of manufacturing, or all of the foregoing.

What is needed is a mechanical structure that allows for unrestricted transfer of z-axis forces from touch panel to sensor (without introducing any additional forces or movements into the system) during normal operation, dead-stop overload force protection to the sensors, and yet minimal additional cost of materials and/or manufacturing. The solution should also accommodate different sensors with different levels of maximum (destructive) force, different touch screen sizes, and should not impact overall product size. This invention described herein offers a simple and low cost solution to the above described problem.

SUMMARY OF THE INVENTION

It is, therefore, an object of the present innovation to introduce compression element(s) between touch panel and sensors to damp the touch forces transferred to the sensors, effectively expanding the range of acceptable force applied to the touch panel before the overload force of the sensors is reached. The compression element(s) facilitate the use of mechanical stops such as stop screws with a far lower tolerance.

These and other objects are accomplished by a semi-rigid pliable snap-dome positioned over each sensor for increased overload protection. The snap dome is unidirectionally-resilient, imparting a predetermined resistance to compression over a known range of travel along the z-axis, but is unyielding along the x- and y-axis. In a preferred embodiment the snap dome is used in combination with a standoff such as a stop screw. As the touch panel is depressed toward the standoff, the snap dome resists compression over a known range of travel along the z-axis until it collapses, and the touch panel encounters the standoff. The standoff then imparts dead-stop overload force protection to the sensors. This allows for the placement of mechanical stops (such as stop screws) with a less exacting tolerance. Moreover, the snap domes introduce no x- or y-axis force losses/increases, and do not cause tilting of the touch panel. The touch force remains perfectly perpendicular and accuracy is preserved.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a semi-rigid pliable snap-dome positioned over each sensor for increased overload protection. The snap dome is unidirectionally-resilient. It imparts a predetermined resistance to compression over a known range of travel along the z-axis, but is substantially unyielding along the x- and y-axis. In a preferred embodiment the snap dome is used in combination with a standoff such as a stop screw. As the touch panel is depressed toward the standoff, the snap dome resists compression over a known range of travel along the z-axis until the touch panel encounters the standoff. The standoff then imparts dead-stop overload force protection to the sensors. The effective result is similar to the known Poron™ microcellular polyurethane pads described above inasmuch as it allows for the placement of mechanical stops (such as stop screws) with a less exacting tolerance. However, the snap domes introduce no x- or y-axis force losses/increases, and does not cause tilting of the touch panel. The touch force remains perfectly perpendicular and accuracy is preserved.

Figure 1:
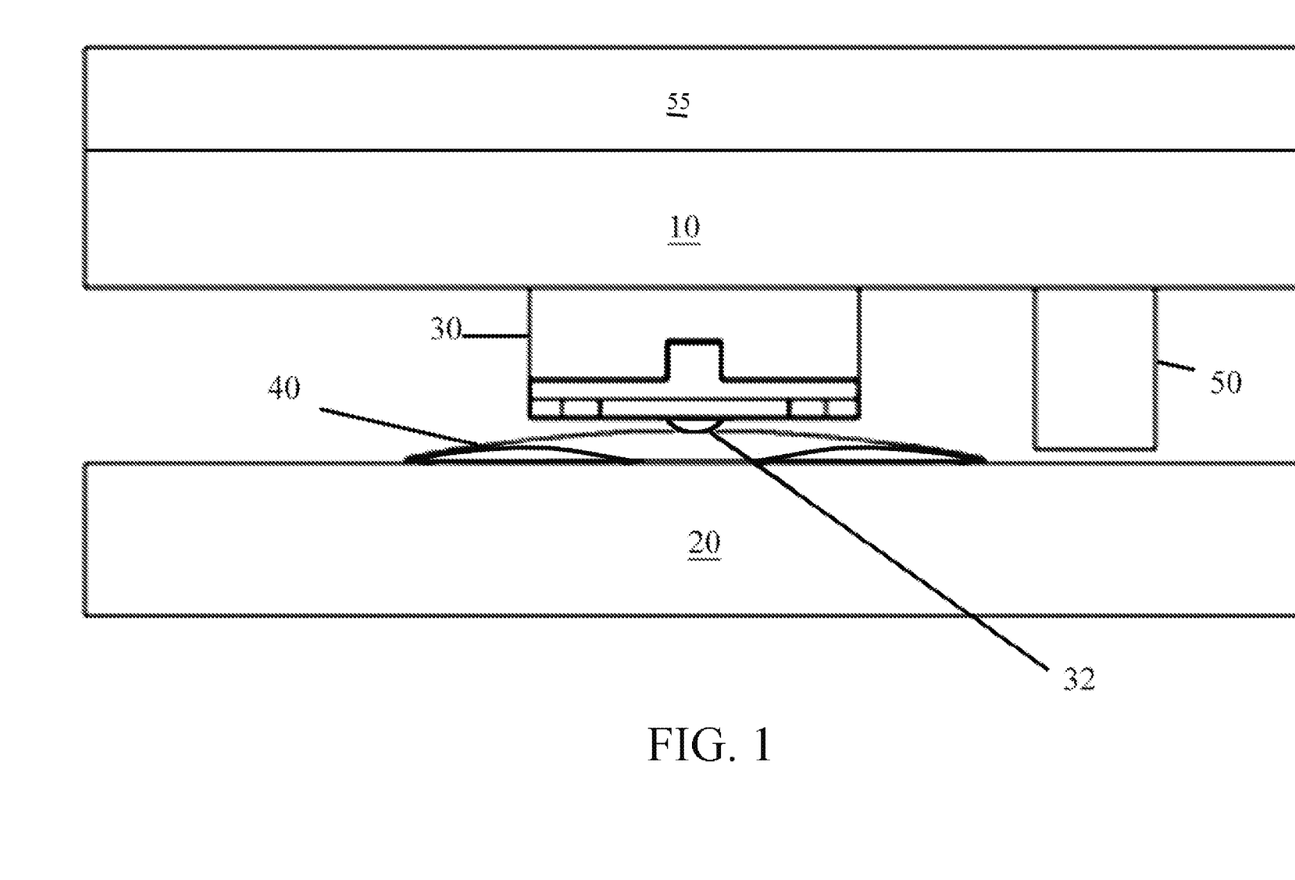
FIG. 1 is a side perspective view of a force-based touch screen system according to an embodiment of the present invention.

FIG. 1 is a side perspective view of a force-based touch screen system employing, for example, an HFD-500 force sensor 30 with ball 32. The force sensor 30 may be affixed directly or indirectly to a floating LCD display 55 and facing an opposing base substrate 20 (which may be a device housing). In the illustrated embodiment, force sensor 30 is indirectly attached to floating LCD display 55 by way of an underlying display support substrate 10 and bears against opposing base substrate 20. Alternately, in an inverted configuration the force sensor 30 may be affixed directly or indirectly to base substrate 20 (e.g., device housing, and facing the opposing floating LCD display 55 and/or display support substrate 10. In either case, a semi-rigid pliable snap-dome 40 is interposed between the facing contact surface (base substrate 20, LCD display 55 or display support substrate 10) and the ball 32 of force sensor 30.

Figure 2:
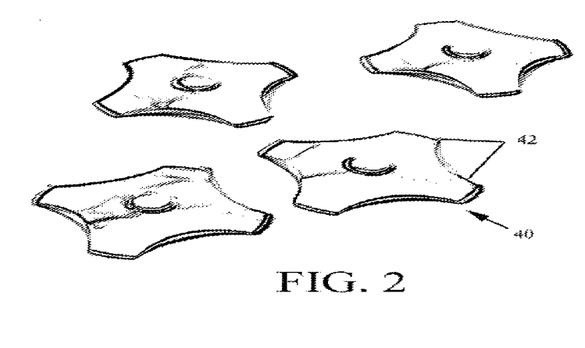
FIG. 2 is a front perspective view of the snap-dome 40 of FIG. 1.
Figure 3:
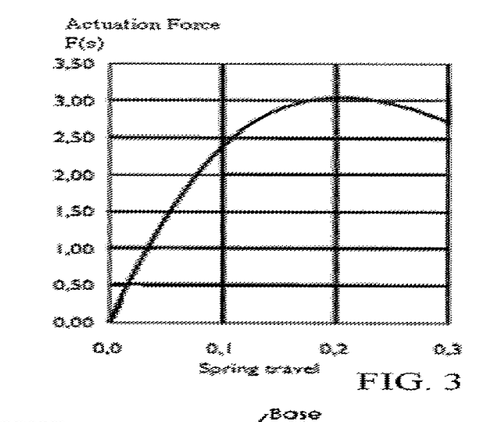
FIG. 3 is a graph of actuation force F(s) as a function of travel for the snap dome 40 of FIG. 2

FIG. 2 is a front perspective view of the snap-dome 40 of FIG. 1. The snap dome 40 may be cut and formed from a thin sheet of semi-rigid yet resilient material such as spring-steel, stainless steel, polyester or other suitable plastic, or may be molded as such. In either case, the snap dome 40 is shaped to define a generally concave shape with a bearing surface for abutting the ball 32, and a supporting foundation 42 equilaterally or coaxially spaced abut the ball 32. The exemplary supporting foundation 42 of FIG. 2 comprises quadrilateral legs, but one skilled in the art should understand that two diametrically opposed legs, three angularly-spaced legs, or a rounded oblong or circular legless base will suffice. As illustrated, the snap dome 40 is used in combination with a standoff 50 such as a stop screw. In operation, the snap dome 40 imparts a known resistance to compression F(s) over a known range of travel S. For example, FIG. 3 is a graph of actuation force F(s) as a function of travel for the snap dome 40 of FIG. 2, where over a range of from 0.1-0.3 mm the actuation force F(s) is remains substantially within a range of from 2.5 to 3.0 N. Again, the force F(s) of the touch panel 20 is confined to the z-axis, but the snap dome 40 remains rigid and unyielding along the x- and y-axis. As the touch panel (LCD Display 55) is depressed toward the standoff, the snap dome 40 resists compression until it collapses, allowing the standoff 50 to stop the touch panel. Thus, the standoff 50 then imparts dead-stop overload force protection to the sensors 30.

The rigidity/resilience of the snap dome 40 is calculated such that, during normal operation (e.g., below 2.5 kilograms of sensor 30 load), the snap dome 40 remains erect and provides essentially a rigid and stationary bearing platform for the sensor ball 32 to ride against. The small minimal deflections of the snap dome 40 below 2.5 kilograms of sensor 30 load do not impact the overall performance touch screen system. However, at a predetermined overload threshold, for example, 2.7 kilograms of sensor load, the snap dome 40 collapses. The standoff 50 (stop screw or the like) positioned in close proximity to the sensor 30 captures the touch panel 20 as it traverses inward from the snap dome 40 collapse.

Figure 4:
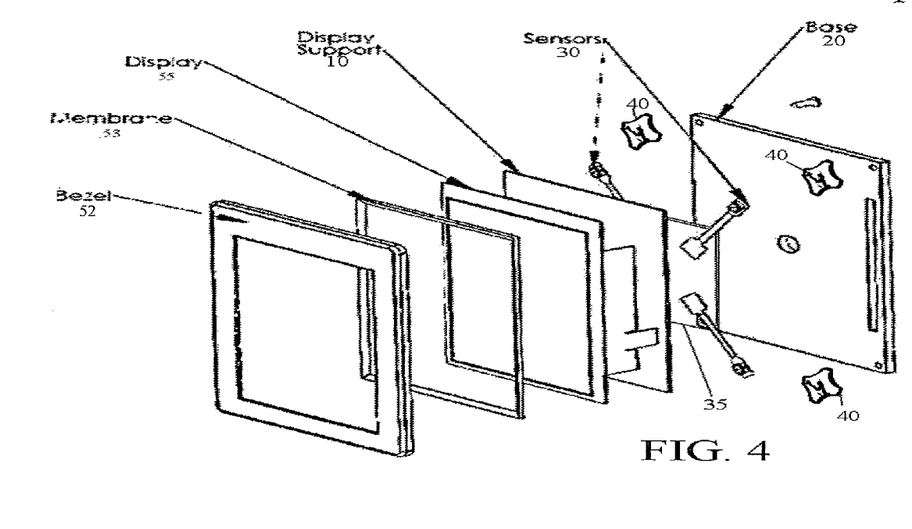
FIG. 4 shows an exploded diagram of an electronic device incorporating snap-domes 40 as in FIGS. 1-2.

To illustrate how the force-based touch screen system of FIG. 1 may be implemented in an electronic device, FIG. 4 shows a touch screen incorporating an LCD display 55 defining an x-y plane having a normal z-axis. A bezel 52 tops the LCD display 55 and is held in place by connecting it to a back base 60. The bezel 52 is only in contact with the LCD display 55 through a suspension membrane 53, akin to an elastomeric or foam pad. The bezel 52 sits atop the suspension membrane 53, which in turn sits atop the LCD display 55. Because the LCD display 55 is very thin and rather fragile, the touch surface of the LCD display 55 may be strengthened and made more rigid by adding a display support 10. The display support 10 is a flat rigid plate that bears against four surface-mounted differential force-sensors 30. The force sensors 30 are affixed to the base substrate 20 (which may be a device housing). The sensors 30 are mounted to display support substrate 10 which in turn is attached beneath floating LCD display 55, and sensors 30 face the opposing base substrate 20. As described above it is possible to invert this configuration such that force sensors 30 are be affixed directly or indirectly to base substrate 20 (e.g., device housing) and facing the opposing LCD display 55 and/or display support substrate 10. The force sensors 30 may be individually mounted or collectively mounted on a sensor circuit board 35, which is a conventional PCB. In either configuration, a semi-rigid pliable snap-dome 40 is interposed between the facing side of the opposing contact surface (here display support 10) and the ball 32 of force sensor 30. The differentially-mounted sensors 30 (or sensor PCB 35) are connected to an electronic device processor. This way, when a user touches the LCD display 55 at some (x, y) position, the force is transmitted through the LCD display 55 to the four under-mounted differential force sensors 30. The exact (x, y) "touch-coordinate" on the touch surface 55 can be calculated.

Figure 5:
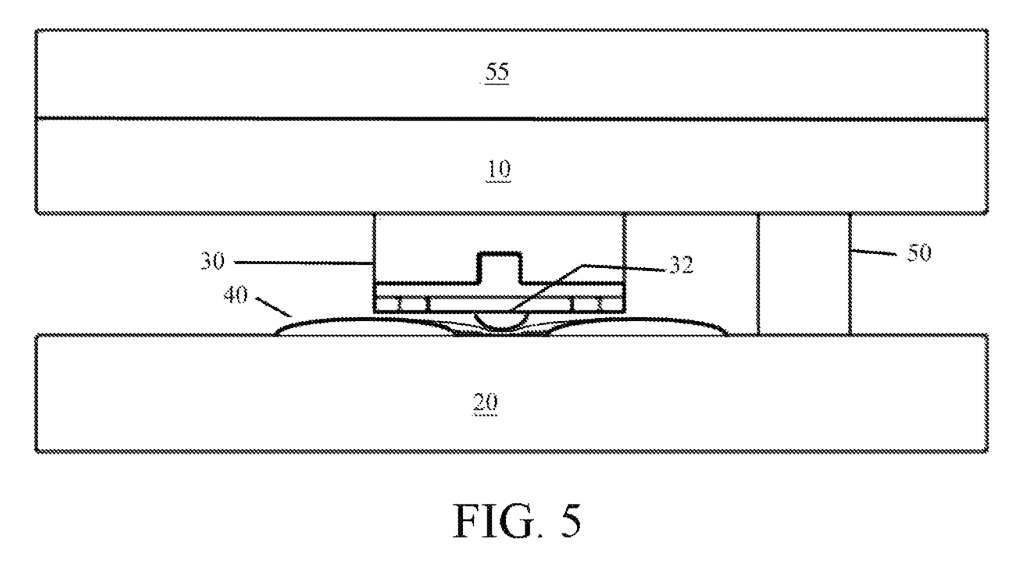
FIG. 5 is a side perspective view of the force-based touch screen system of FIG. 1 with snap-dome 40 in the collapsed configuration.

FIG. 5 is a side perspective view of the force-based touch screen system of FIG. 1 with snap-dome 40 in the collapsed configuration. The bearing surface of snap-dome 40 abutting the ball 32 has collapsed inward, allowing the standoff 50 to impart dead-stop overload force protection to the sensor 30. The standoff 50 carries any additional loads that exist when the snap dome 40 collapses, but does not interfere with normal operation.

The snap dome 40 as described above allows a much larger tolerance range than a traditional stop screw approach. For example, when optimized for an HFD-500 force sensor 30 the snap dome 40 collapses at 2.7 kilograms (26.5 N) of force. Any additional load above 2.7 kilograms is carried by the standoff 50. The snap dome allows a 0.5 millimeter (0.020") range of travel of the touch panel 20/sensor ball 32, an order of magnitude improvement over the traditional stop screw. The increased tolerance is within typical manufacturing capabilities and potentially eliminates any need for adjustment of the standoff height. If the application utilizes an adjustable stop-screw as a standoff, the setting procedure can be relatively coarse, improving assembly capability and speed. Standoff 50 placement is less critical since the increased travel range allows greater flexibility in the positioning of components.

Although snap dome 40 construction details may vary, it has been found that the smallest footprint snap dome that provides a 2.7 kilogram collapse force is 12 millimeters (0.472") in diameter. In the event that a smaller footprint is required of the snap dome, smaller snap domes 40 can be stacked together to achieve the correct collapse force, or thicker/larger snap domes 40 can be tailor made to fit the application and/or the force sensor 30 requirements.

Snap domes 40 can be applied as self-adhesive peel-and-place components, custom arrayed peel-and-place sheets or soldered into position, which allows for a high degree of flexibility not only in the design, but also in the manufacturing process.

Snap domes 40 may be applied either to the base substrate 20 as illustrated or to display support substrate 10 (in the latter case covering the sensor 30).

If desired, an additional substrate may be interposed between the sensors 30 and the snap domes 40 to assist in transferring the contact force. For instance a cap over each sensor 30 or a sheet member covering all sensors 30 will interpose a contact surface between the sensors 30 and the corresponding snap dome 40.

Figure 6:
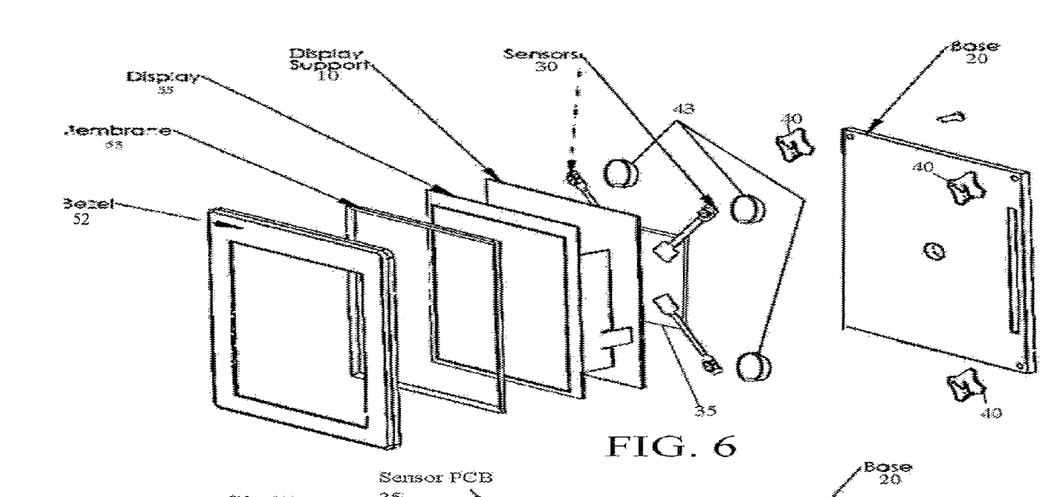
FIG. 6 is a perspective illustration showing an exemplary cap 43 embodiment.

FIG. 6 is a perspective illustration showing an exemplary cap 43 embodiment, one each covering each snap dome 40 resident on substrate 10, so that as the sensor 30 ball bearing pushes against the cap 43, the cap in turn pushes against the snap dome 40 to transfer the contact force. The caps 43 may be individual caps, or integrally formed as a unitary piece, and need not be cap-shaped. Rather, a unitary planer sheet member interposed between all the sensors 30 and all the corresponding snap domes 40 will suffice.

Figure 7:
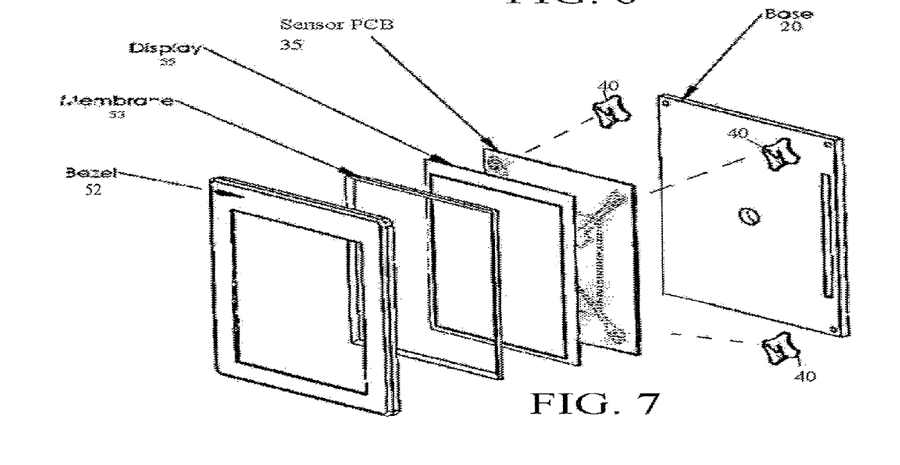
FIG. 7 illustrates another embodiment in which the snap domes 40 are located behind the force sensor circuit board and device housing.

One skilled in the art should also understand that the snap domes 40 need not bear directly against the ball bearings 32 of sensors 30. For example, the snap domes 40 may be sandwiched between the leads of sensors 30 or the sensor PCB 35 and the opposing contact surface (base substrate 20 or display support substrate 10). In this case the sensor ball bearing 32 will press directly against the opposing substrate 10, 20 and yet when fully loaded the force allows the sensor 30 or sensor PCB 35 to move. FIG. 7 illustrates one such embodiment in which the LCD display 55 is mounted atop a sensor PCB 35 such that display 55, optional display support substrate 10 (not shown), force sensors 30 and sensor PCB 35 are essentially one integral unit. The above-described snap domes 40 are located at each corner behind the sensor PCB 35 and facing the base 20 (device housing). As above, a standoff (e.g., stop screw) may protrude from either rearward from the sensor PCB 35 or forward from the base substrate 20 for prevention of over-compression.

Figure 8:
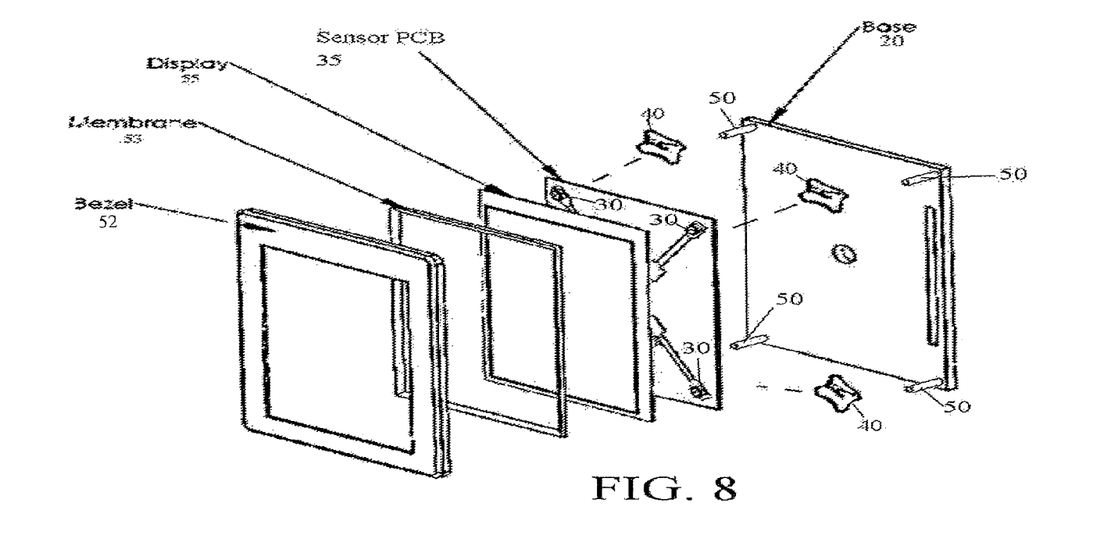
FIG. 8 is a perspective diagram of another embodiment of the invention.
Figure 9:
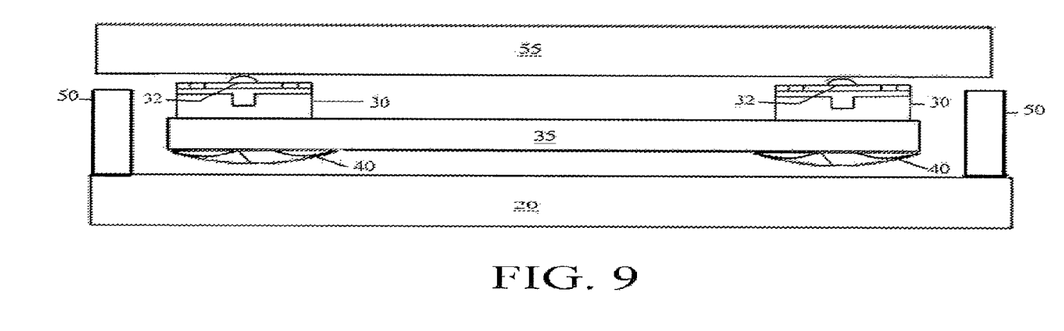
FIG. 9 is a side cross-section of the embodiment of FIG. 8.

FIGS. 8 and 9 illustrate yet another embodiment in which the LCD display 55 rides atop a sensor PCB 35 with the force sensors 30 frontally-mounted on PCB and facing/bearing against the backside of LCD display 55. The above-described snap domes 40 are mounted on the sensor PCD 35 located at each corner behind the sensor PCB 35 and facing the base 20 (device housing). As best seen in FIG. 9 the dimensions of the sensor PCB 35 are slightly smaller than those of the LCD display 55 and base 20, allowing corner-mounted standoffs 50 (e.g., stop screw or integrally-molded posts) to protrude forwardly from base 20 past the sensor PCB 35 to the LCD display 55 for prevention of over-compression. With this configuration, when force is applied to the LCD display 55, it is transmitted to the bearings 32 of force sensors 30. When over force is applied, the snap domes 40 mounted between the back of the PCB 35 and the base 20 collapse and allow the LCD display 55 to travel until it hits the dead stop of corner-mounted standoffs 50. At this point, the corner-mounted standoffs 50 prevent the LCD display 55 from traveling any closer to the base 20 (back plane or device housing) and thereby preventing the sensors 30 from over force. In all the above-described embodiments, the mechanical design allows for unrestricted transfer of z-axis forces from touch panel 20 to sensor 30 without introducing any additional forces or movements into the system during normal operation, plus dead-stop overload force protection to the sensor 30, and yet it involves minimal additional cost of materials and/or manufacturing. Moreover, the solution can accommodate different sensors with different levels of maximum (destructive) force, different touch screen sizes, and should not impact overall product size.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A touch screen assembly for an electronic device having a processor, said touch screen assembly comprising:
    an electronic display screen;
    a substrate;
    a plurality n of differentially-mounted force sensors mounted between said display screen and said substrate and differentially positioned along an x- and y-axis, said force sensors being electrically connected to the processor for registering a force z from a touch of said electronic display screen at any position along said x- and y-axis and for providing an analog differential force signal z; and
    a plurality n of differentially-mounted semi-rigid snap-domes each positioned below a respective force sensor and having a central axis that is aligned with a central axis of said respective force sensor, each of said plurality n of snap domes being unidirectionally rigid to a known point of collapse;
    a plurality n of caps each interposed between and in contact with a corresponding one of said snap domes and a corresponding one of said force sensors; and
    a rigid standoff interposed between said electronic display screen and said substrate for arresting movement of said electronic display screen toward said substrate after the known point of collapse of at least one snap-dome, thereby imparting dead-stop overload force protection to the force sensor.

2. The touch screen assembly for an electronic device according to claim 1, wherein said number n is two (2).

3. The touch screen assembly for an electronic device according to claim 1, wherein said number n is four (4).

4. The touch screen assembly for an electronic device according to claim 1, wherein said snap-domes are unidirectionally-resilient along a z-axis in an x, y, z coordinate system, and impart a predetermined resistance to compression over a known range of travel along the z-axis, but are unyielding along the x- and y-axis.

5. The touch screen assembly for an electronic device according to claim 1, wherein said standoff is a stop screw.

6. The touch screen assembly for an electronic device according to claim 1, further comprising a plurality n of caps each interposed between a corresponding one of said force sensors and a corresponding one of said semi-rigid snap-domes.

7. A protection mechanism for force-based touch sensitive inputs, comprising:
    a cap interposed between a snap dome and a force-based sensor, said force-based sensor interposed between said cap and a first opposing surface, said snap dome interposed between said cap and a second opposing surface and having a central axis that is aligned with a central axis of said force-based sensor, said snap dome being formed from a semi-rigid pliable material shaped in a generally concave shape with a symmetric supporting foundation about a bearing surface, said snap dome being unidirectionally rigid to a known point of collapse; and
    a rigid standoff having a central axis that is parallel to a central axis of said snap dome for arresting movement of said force-based sensor toward said opposing surface after the known point of collapse of the snap dome, thereby imparting dead-stop overload force protection to the force-based sensor.

8. The protection mechanism according to claim 7, wherein said snap dome comprises a semi-rigid concave annulus defined with a plurality of legs.

9. The protection mechanism according to claim 8, wherein said plurality of legs comprises four equi-angularly-spaced legs.

10. A device for overload protection of a force sensor, comprising:
    an individual cap sandwiched between and in contact with said force sensor and a resilient snap dome, said force sensor sandwiched between and in contact with said individual cap and a first opposing surface, said snap dome sandwiched between and in contact with said individual cap and a second opposing surface, said snap dome being formed from a semi-rigid pliable material in a generally concave shape with an apex abutting the individual cap and a symmetric supporting foundation abutting the second opposing surface, said snap dome being unidirectionally rigid to a known point of collapse; and
    a rigid standoff offset laterally from said snap dome and said force sensor such that a central axis of said rigid standoff is parallel to a central axis of said resilient snap dome, said rigid standoff imparting dead-stop overload force protection to the force sensor when said snap dome collapses.

11. The device for overload protection of a force sensor according to claim 10, incorporated in a touch screen assembly for an electronic device having a processor, an electronic display screen, a substrate, a plurality of differentially-mounted force sensors mounted between said display screen and said substrate and electrically connected to the processor for registering a force z from a touch of said lens at any position.

12. A touch screen assembly for an electronic device having a processor, said touch screen assembly comprising:
    an electronic LCD display screen; a base substrate parallel to said display screen; a
    circuit board between said LCD display screen and said base substrate, said circuit board containing a number n of force sensors positioned along an x- and y-axis, said force sensor(s) being electrically connected to the processor for registering a force z from a touch of said LCD display screen at any position along said x- and y-axis and for providing an analog force signal z;
    a number n of semi-rigid snap-domes each mounted at or near a respective corner of said circuit board and facing said base substrate and having a central axis that is aligned with a central axis of a corresponding one of said force sensors, each of said snap domes being unidirectionally rigid to a known point of collapse;
    a number n of caps each sandwiched between and in contact with a corresponding one of said force sensors and a corresponding one of said resilient snap domes; and one or more rigid standoffs, each standoff being offset from the number n of snap domes, caps, and force sensors, said one or more standoffs imparting dead-stop overload force protection to a force sensor when a corresponding snap dome collapses.

13. The touch screen assembly for an electronic device according to claim 12, wherein said number n is one (1).

14. The touch screen assembly for an electronic device according to claim 12, wherein said number n is four (4).

15. The touch screen assembly for an electronic device according to claim 14, wherein said snap-domes are unidirectionally-resilient along a z-axis in an x, y, z coordinate system, and impart a predetermined resistance to compression over a known range of travel along the z-axis, but are unyielding along the x- and y-axis.

16. The touch screen assembly for an electronic device according to claim 14, wherein at least one standoff is interposed between the display module and the base substrate for prevention of over-compression of said corresponding force sensor(s).

17. The touch screen assembly for an electronic device according to claim 14, wherein the one or more standoffs comprises four corner-mounted standoffs interposed between the display module and the base substrate for prevention of over-compression of said corresponding force sensors.

18. The touch screen assembly for an electronic device according to claim 17, wherein said four corner-mounted standoffs are attached to said base substrate.

19. The touch screen assembly for an electronic device according to claim 18, wherein said four corner-mounted standoffs are posts integrally molded to said base substrate.

20. The touch screen assembly according to claim 18, wherein each force sensor is positioned near or at a respective corner of the circuit board.

* * * * *